June 9, 1959 — M. MANIACI — 2,889,602
PROTECTIVE PIPE CLAMP
Filed Sept. 9, 1957
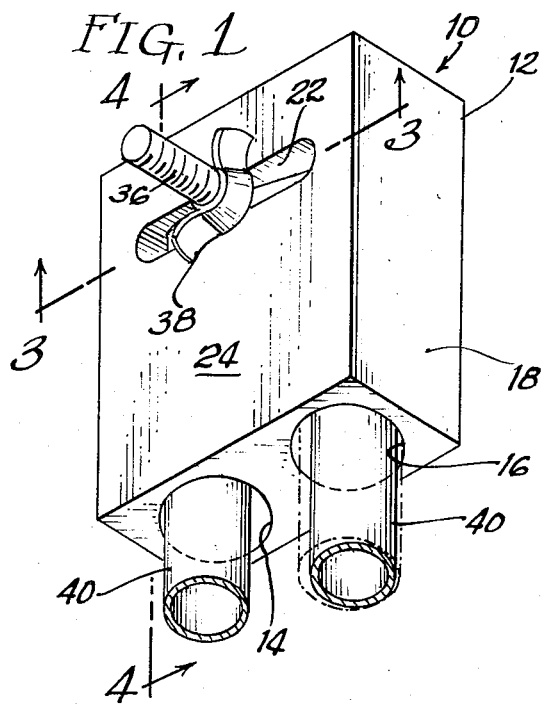
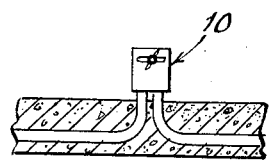
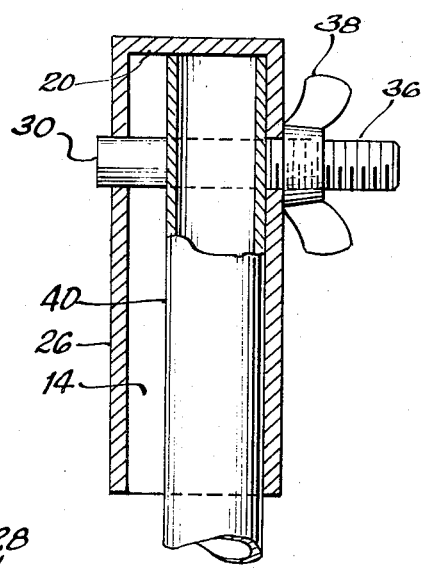
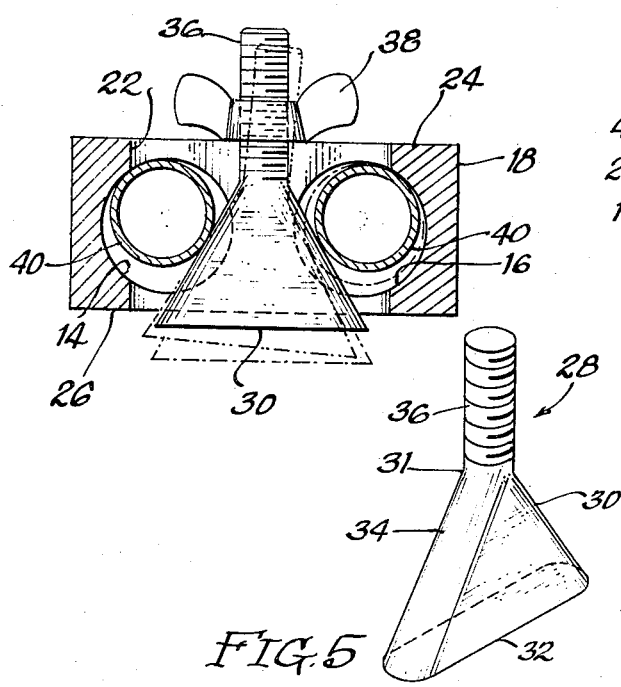
INVENTOR.
Matteo Maniaci
BY
Julius L. Rubinstein
Attorney

United States Patent Office 2,889,602
Patented June 9, 1959

2,889,602
PROTECTIVE PIPE CLAMP
Matteo Maniaci, Chicago, Ill.

Application September 9, 1957, Serial No. 682,657

4 Claims. (Cl. 24—81)

This invention relates to a clamp and more particularly to a device for both clamping a plurality of tubes together and protecting their end portions.

Electrical conduits and thin-walled pipes, commonly referred to as tubing, are used to protect electrical wiring in modern industrial construction. Sections of the tubing are disposed in horizontal or vertical positions beneath the floors, and consequently must be carefully installed and positioned before the floors are laid. This is particularly true in the case of cement floors. The ends of the tube sections project upwardly above the floor level wherever an electrical outlet box or a 1900 or square box, hereafter referred to simply as a box, is to be located. To provide an electrical connection between the various boxes, the adjacent ends of two or more sections of tubing are rigidly secured to them. With this arrangement, the wires in one tube section can supply electric power to the box, and in addition they can be connected to the wires in the other tube sections attached to the box. These other tube sections are connected at their opposite ends to other boxes in the building.

The boxes are located in a fixed position as determined by the building plans, so the tubing must be precisely located. This creates a problem, since the tubing must be installed before the floor is laid, and while the construction work is continuing. This construction work may subject the tubing to accidental jars and blows which may dislodge them and move them so that they can't be connected to the boxes. This is particularly true where cement floors are being laid because the effect of the cement on the tubing is more pronounced. In addition, there is the possibility that some of the cement or other foreign matter may accidentally enter the open upward ends of the tubing and plug them.

To prevent this from happening, the ends of the tubing have been mounted inside these 1900 or square boxes before construction was completed and before the floor was laid. This protected the open ends of the tubing from the entry of foreign matter, and kept the ends of the tubing connected to the box in relatively fixed positions so that accidental blows or jars couldn't separate them. Such a use for these boxes was not contemplated in their design, and consequently this procedure has not proven satisfactory. This was due to the fact that these boxes were not required to support weights or to be exposed to the elements, and so they could be made fairly cheaply by using thin walled metal, usually zinc coated steel. This material is also readily subject to the corrosive effects of oxidation. This meant that accidental jars and blows received during construction could damage and deform the boxes, and the exposure to the elements could corrode them. For these reasons, by the time construction was completed many of these boxes had to be discarded and replaced. This is an important expense in large industrial construction because of the great number of these boxes involved.

Another objection to this use of these boxes is that they are awkward to work with. Some of the tubing, such as the threaded electrical conduits requires the use of a large wrench and a nut for rigidly securing it to the box, and these tools may not always be conveniently available. The thin walled pipes, also sometimes used in this work are even more troublesome because they are unthreaded. For this reason, connecters must be attached to them. These connecters are adapted to be clamped to the end of the pipe and are provided with a threaded end, so that the thin walled pipes can be secured to the boxes in the same way as the threaded electrical conduits. But this procedure again requires the uses of a large wrench and nut. In addition, when more than one pipe or conduit has to be secured to a box, they have to be separately attached. These are all time consuming procedures, and in view of the fact that the pipes or conduits must occasionally be removed and readjusted to compensate for the disturbing effects of blows and jars, it is apparent that much time must be spent in periodically checking and readjusting the positions of these tubes or boxes. In view of the fact that construction workers are paid on an hourly basis, this time greatly increased the expense to the contractor.

What is needed therefore and comprises the chief object of this invention is a reusable and easily installed device for holding two or more of these conduits or pipes in relatively fixed positions, and at the same time, protect the open ends of these pipes from deformations due to blows and from the entrance of foreign matter.

Another object of this invention is to provide a reusable device for protectively holding the ends of two or more conduits or thin walled pipes in a relatively aligned position which is not subject to corrosion.

Still another object of this invention is to provide a reusable device for protectively holding the ends of two or more conduits or thin walled pipes which is strong enough to resist jars and blows without damage.

Still another object of this invention is to provide a reusable device for protectively holding the ends of two or more conduits or thin walled pipes which can be operated without the use of any special tools.

Yet a further object of this invention is to provide a reusable device for protectively holding the ends of two or more conduits or thin walled pipes which can hold the threaded and unthreaded conduits and pipes together without requiring the use of any special adaptors or connectors.

Another object of this invention is to provide a reusable device for protectively holding the ends of two or more conduits or thin walled pipes which can hold tubes or pipes of different sizes and cross sectional shapes in a relatively fixed position without requiring the use of any special adaptors or connectors.

Still a further object of this invention is to provide a protective holder for elongated objects which protectively holds the ends of these elongated objects in a relatively fixed position and at the same time protects them from damage due to blows.

These and other objects of this invention will become better understood when read in connection with the accompanying drawings and specification wherein:

Fig. 1 is a perspective view of one embodiment of this invention;

Fig. 2 is an elevational view showing the way the device temporarily holds and protects the ends of the pipes or conduits above the cement flooring;

Fig. 3 is a sectional view taken on the line 3—3 of Fig. 1 looking in the direction indicated;

Fig. 4 is a sectional view taken on the line 4—4 of Fig. 1 and looking in the direction indicated; and Fig. 5 is a perspective view of the clamping element.

Referring now to Fig. 1 of the drawings, the protective pipe or tube clamp indicated generally by the reference numeral 10 comprises a rectangular metallic block or housing 12. The block is provided with spaced parallel bores 14 and 16 which are parallel to the sides 18 of the block and extend partially therethrough. These bores terminate in a back wall 20, see Fig. 4. The bores in the example shown are cylindrical in cross section, although other cross sectional shapes may be used corresponding to the cross sectional shape of the pipes or tubes to be protectively clamped. A slot 22 extends completely through the block, passing through the top and bottom walls 24 and 26, see Fig. 3. This slot is transverse to and in communication with the spaced parallel bores 14 and 16.

Locking means, indicated generally by the reference numeral 28 are associated with the housing and act to clamp the ends of the tubes inside the spaced parallel bores, see Fig. 5. This locking means comprises a solid metallic wedge member 30. In the embodiment shown, the wedge member is substantially triangular, but it is apparent that alternative shapes may be useful, depending upon the relative sizes and cross sectional shapes of the pipes or tubes that are to be clamped inside the housing. The length of the base 32 of the wedge member and its thickness 34 are enough less than the length and width of the slot 22 to permit the wedge member to freely pass through it. A threaded bolt 36, also sized to freely pass through the slot 22 is secured at one end by any conventional means such as welding to the apex 31 of the wedge member 30, see Fig. 5. A wing nut 38, which is too large to pass through the slot 22 is in threaded engagement with the bolt 36. The end of bolt 36 may be peened over to prevent the wing nut from being removed from it and becoming lost. This wing nut is adapted to rest on either the top or bottom surface of the block 12 with the bolt 36 and the wedge member 30 inside the slot 22, see Fig. 3. With this arrangement, rotating the wing nut in one direction would draw the wedge member upwards from the dotted line position shown in Fig. 3, further into the slot 22 in the block 12.

In operation, the wedge member 30 is inserted in the slot 22, so its base 22 projects far enough below the bottom surface 26 of the block so that electrical conduits or thin walled unthreaded or threaded pipes or tubes 40 may be inserted inside the bores 14 and 16, see Figs. 3 and 4. Then the wing nut 38 is rotated so that the wedge member 30 is drawn up into the slot 22 inside the housing 12 and into wedging engagement with the tubes 40 in the bores 14 and 16. In this position, the ends of the tubes are held against the back wall 20 of the bores so that no foreign matter can enter them, and they are further protected against deformations due to blows and jars. These protective pipe clamps may come in various sizes where it is necessary to protect the entire length of the tubing projecting above the cement flooring, see Fig. 2.

As seen in Fig. 3, the length of the slot 22 is larger than the length of the base 32 of the wedge member 30 and the wedge member is freely movable therein. This arrangement permits the wedge member to rock slightly in the slot so that tubes of different sizes and shapes may be inserted in the bores in the block and be simultaneously locked therein. The block 12 has no moving or threaded parts and so it is entirely unaffected by corrosion and since it is substantially solid, it can easily withstand all sorts of accidental blows without damage.

It is apparent that the protective pipe clamp constructed according to this invention can quickly and conveniently clamp and protect pipes or tubes of varying sizes and shapes inside the block, and no special tools are required. Furthermore, the end portions of these tubes or pipes are protected against deformations due to blows or from damage due to the entry of foreign matter, such as cement.

Although the principle object of this invention was to provide a protective pipe clamp for the purposes described above, it is apparent that the lock means and the lock means receiving opening as exemplified by the wedge member with the threaded bolt attached and the slot formed in the housing, has wider applications. For example, the conventional 1900 or square boxes could be modified to incorporate these body features so that pipes having different dimensions, both threaded and unthreaded could be easily mounted in its pipe receiving openings, without the use of adaptors or connectors, or the need for auxiliary tools, and the claims should be construed accordingly.

The invention may be embodied in other forms without departing from the spirit or essential characteristics thereof, as set forth in the claims, and the present embodiment is therefore to be considered as illustrative and not restrictive, and it is intended to include all changes which come within the scope and range of the claims.

I claim:

1. An apparatus of the class described comprising in combination a housing, there being bore means extending partially through said housing, said bore means adapted to receive the ends of a plurality of tubes, said housing having a slot extending therethrough, said slot transverse to and communicating with said bore means, and lock means, said lock means comprising a wedge member and a threaded bolt, one end of said threaded bolt secured to the apex of the wedge member, said wedge member and said threaded bolt sized to freely pass through said slot in said housing, a nut adapted to rest on a surface of said housing over said slot, said nut in threaded engagement with said bolt and having a dimension larger than the width of the slot so that when said wedge member is in said slot and tubes are in said bore means, rotating the nut draws the wedge member up into the housing and into simultaneous wedging and locking engagement with the tubes in said bore means.

2. An apparatus of the class described comprising in combination a housing, there being spaced parallel bores extending partially through said housing, said bores adapted to receive the ends of a plurality of tubes, said housing having a slot extending therethrough, said slot transverse to and communicating with said bore means, and lock means, said lock means comprising a wedge member and a threaded bolt, one end of said threaded bolt secured to the apex of the wedge member, said wedge member and said threaded bolt sized to freely pass through said slot in said housing, a nut adapted to rest on a surface of said housing over said slot, said nut in threaded engagement with said bolt and having a dimension larger than the width of the slot so that when said wedge member is in said slot and tubes are in said bores, rotating the nut draws the wedge member up into the housing and into simultaneous wedging and locking engagement with the tubes in said bore means.

3. An apparatus of the class described comprising in combination, a rectangular block, there being spaced parallel bores parallel to one side of the block and extending therethrough, each bore adapted to receive the end of a tube, said block having a slot extending therethrough, said slot transverse to and communicating with said spaced parallel bores, and lock means comprising a wedge member and a threaded bolt, one end of said threaded bolt rigidly secured to the apex of the wedge member, said wedge member and said threaded bolt sized to freely pass through said slot in said block, a nut adapted to rest on a surface of said block over said slot, said nut in threaded engagement with said bolt and having a dimension larger than the width of the slot so that when said wedge member is in said slot and a tube is in each bore, rotating the nut in one direction draws the wedge member up into the block and into wedging and locking engagement with the tube in each of said spaced parallel bores.

4. An apparatus of the class described comprising in combination a rectangular block, there being spaced parallel bores parallel to one side of the block and extending partially therethrough, each bore adapted to receive the end of a tube, said block having a slot extending therethrough, said slot transverse to and communicating with said spaced parallel bores, and lock means, said lock means comprising a solid substantially triangular wedge member, the length of the base of said wedge member and its thickness smaller than the length and width of the slot to provide a loose fit so that the wedge member can freely pass through the slot, a threaded bolt, one end of said threaded bolt rigidly secured to the apex of said triangular wedge member, said bolt sized to freely pass through the slot in said block, a wing nut adapted to rest on the surface of said block over said slot, said wing nut in threaded engagement with said bolt, and having at least one dimension larger than the width of said slot so that when said wedge member is in said slot with its side surfaces below the tubes in each of said spaced parallel bores, rotating the wing nut in one direction draws the wedge member up into the block and into wedging and locking engagement with the tubes in said spaced parallel bores.

References Cited in the file of this patent

UNITED STATES PATENTS

| | | |
|---|---|---|
| 551,016 | Ward | Dec. 10, 1895 |
| 2,161,978 | Rosenbaum | June 13, 1939 |
| 2,333,539 | Luders | Nov. 2, 1943 |